United States Patent [19]
Castronuovo

[11] 3,744,403
[45] July 10, 1973

[54] MARSHMALLOW TOASTING DEVICE

[76] Inventor: John Castronuovo, Albany Post Road, New York, N.Y.

[22] Filed: Oct. 24, 1972

[21] Appl. No.: 299,828

[52] U.S. Cl.............. 99/421 V, 219/389, 219/521, 99/421 P
[51] Int. Cl. ........................................... A47j 37/04
[58] Field of Search.................. 219/214, 217, 388, 219/389, 521; 99/391, 420, 421 P, 421 HV, 421 V, 443

[56] References Cited
UNITED STATES PATENTS

| | | | |
|---|---|---|---|
| R20,024 | 6/1936 | Kohler | 219/214 |
| 1,854,850 | 4/1932 | Linkenauger | 99/420 |
| 2,049,481 | 8/1936 | Walterspiel | 99/421 V |
| 2,156,860 | 5/1939 | Lucas | 99/421 V |
| 2,205,914 | 6/1940 | Stafford | 99/421 P X |
| 2,377,873 | 6/1945 | Finizie | 99/421 P |
| 2,517,360 | 8/1950 | Singer | 219/388 X |
| 2,565,786 | 8/1951 | Spartalis | 99/421 P |
| 2,577,327 | 12/1951 | Hill | 219/389 |
| 3,125,015 | 3/1964 | Schlaegel | 99/421 P |
| 3,277,813 | 10/1966 | Luscher | 99/391 |

Primary Examiner—Volodymyr Y. Mayewsky
Attorney—Rupert J. Brady, James G. O'Boyle et al.

[57] ABSTRACT

An electrical appliance for toasting marshmallows, the device consisting of a housing having a base in which an electric motor driven by house current drives a gear train so to rotate a horizontal turntable that travels under a canopy that serves as an oven where electric heating elements are located, and the turntable supporting upright picks on each of which a marshmallow is impaled, each pick slowly rotating as the turntable turns, so that all sides of the marshmallow are faced to the oven heating elements during toe toasting operation.

1 Claim, 3 Drawing Figures

PATENTED JUL 10 1973 3,744,403
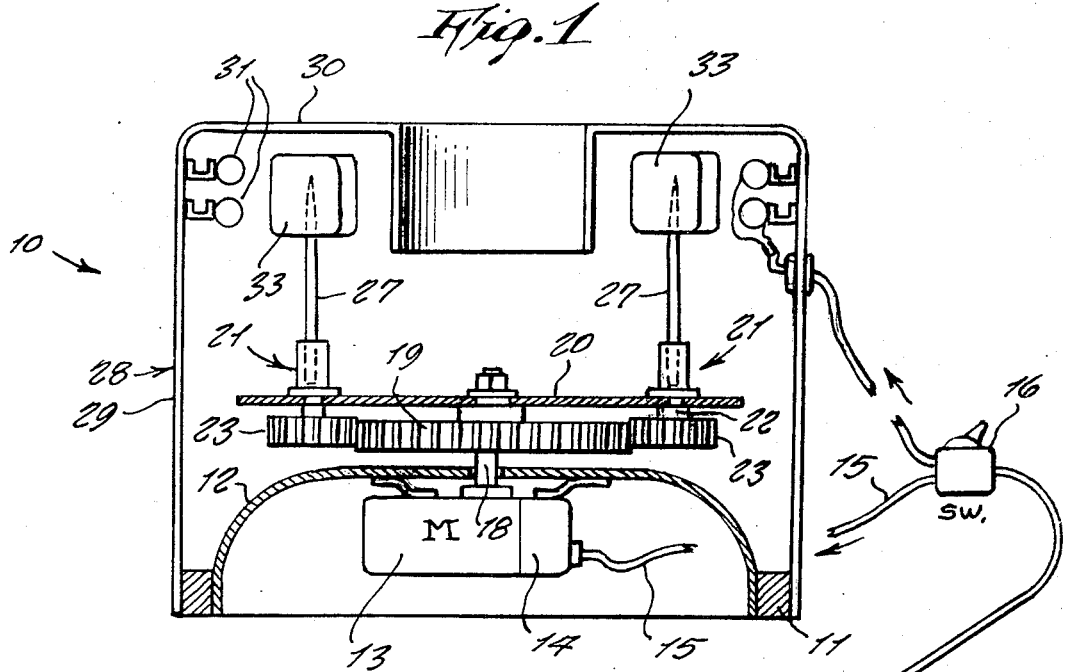
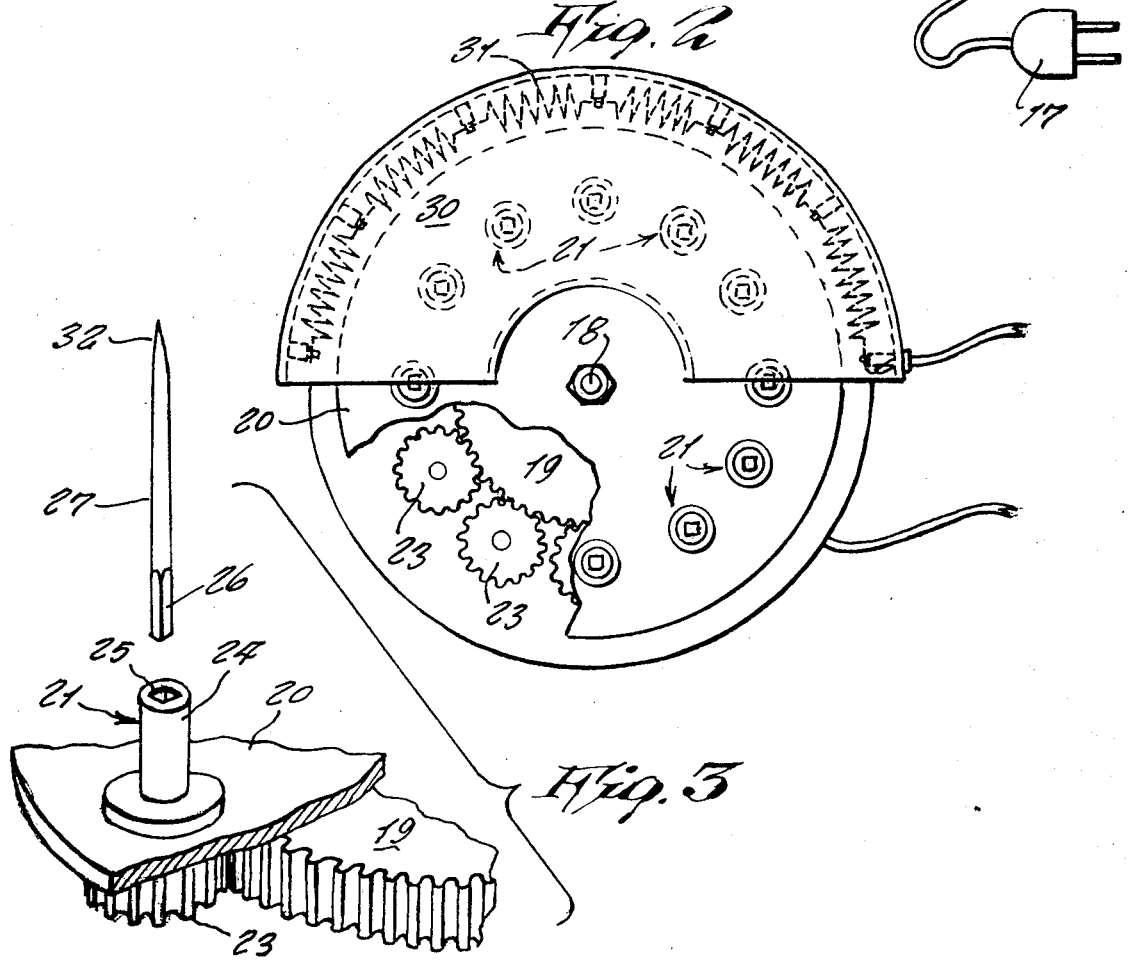

MARSHMALLOW TOASTING DEVICE

This invention relates generally to household electrical kitchen appliances.

A principle object of the present invention is to provide a device for toasting marshmallows.

Another object is to provide a marshmallow toasting device which will toast marshmallows evenly on all sides without burning them, and which by incorporating a heat control rheostat will allow marshmallows to be toasted either lightly or dark as individually desired by a person.

Still another object is to provide a marshmallow toasting device that is quick in operation, and which is safe so that it can be even operated by children as easily as an electric toaster.

Other objects are to provide a MARSHMALLOW TOASTING DEVICE which is simple in design, inexpensive to manufacture, rugged in construction, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a front elevation view of the invention, shown partly in cross section.

FIG. 2 is a top plan view thereof, shown partly broken away so to illustrate the gear drive.

FIG. 3 is a detail perspective view of the gear drive for rotating the marshmallow spindle or pick.

Referring now to the drawing in detail, the reference numeral 10 represents a marshmallow toasting device according to the present invention wherein there is a base 11 including an inverted sheet metal bowl 12 which on its underside supports an electric motor 13 and a transformer 14 so to convert house current voltage to a low power suitable for the motor. An electric extension cord 15 from the motor leads outwardly to an external switch 16 and then to a male plug 17 that is receivable into a house electric outlet socket.

A motor shaft 18 of the motor protrudes upwardly through the base and has large gear 19 secured near its upper end while the terminal upper end of the shaft has a circular turntable 20 secured thereupon for being rotated.

A circular arrangement of pick holders 21 are mounted individually rotatably free on the turntable, each holder 21 comprising of a shaft 22 that protrudes through the turntable and is journalled in a bearing of the turntable, the lower end of shaft 22 having a small gear 23 fixedly secured thereto, and which engages the large gear 19. The upper end of the shaft has an adaptor 24 fixedly mounted thereupon having square opening 25 on its upper end so to receive a square end 26 of a marshmallow pick 27.

A semi-cylindrical metal shell 28 including semi-cylindrical side wall 29 and generally semi-cylindrical top wall 30 is secured along its lower edge around the outer side of the base 11, and the inner side of the top wall 30 supports near its upper end two semicircular rows of electric heating elements 31 which are on the elevation of the pointed end 32 of the picks 27.

In operative use, the switch is turned on so to cause the turntable to travel into an oven thus formed by the shell 28, and at the same time cause the picks 27 to turn. Marshmallows 33 then are impaled on the ends 32 of the picks 27 which then travel into the oven where they are toasted. After coming out of the oven, the toasted marshmallows are then simply taken off.

While certain novel features of this invention have been shown and described and are pointed out in the annexed claims, it will be understood that various omission, substitutions and changes in the forms and details of the device illustrated and in its operation can be made by those skilled in the art without departing from the spirit of the invention.

What is claimed as new is:

1. In a marshmallow toasting device, the combination comprising a base supporting an electric motor having a motor shaft, a gear train and a horizontal turntable being supported and rotated by said motor shaft, a circular support arrangement of freely rotatable holders mounted on said turntable, each of said holders beings rotated by said gear train and includes an adaptor and a vertical pick removably received in said adapter, the upper end of each pick is adaptable to impale and support a marshmallow for toasting, a semi-cylindrical shell secured around said base forming a hollow oven into which said turntable with the supported picks is positioned for rotating, electric heating elements supported on the inner surface of said shell for toasting said marshmallows, and an insulated electric extension cord being electrically connected to said electric heating elements and said electric motor, said extension cord having an electric external switch and a male plug for connecting said extension cord to an electric source of energy.

* * * * *

UNITED STATES PATENT OFFICE
CERTIFICATE OF CORRECTION

Patent No. 3,744,403          Dated July 10, 1973

Inventor(s) JOHN CASTRONUOVO

It is certified that error appears in the above-identified patent and that said Letters Patent are hereby corrected as shown below:

On the cover sheet [56], after the "References Cited", "Attorney--Rupert J. Brady, James G. O'Boyle et al." should read -- Attorney--Carl Miller -- .

Signed and sealed this 25th day of December 1973.

(SEAL)
Attest:

EDWARD M. FLETCHER, JR.          RENE D. TEGTMEYER
Attesting Officer                 Acting Commissioner of Patents